Figures 1, 2:
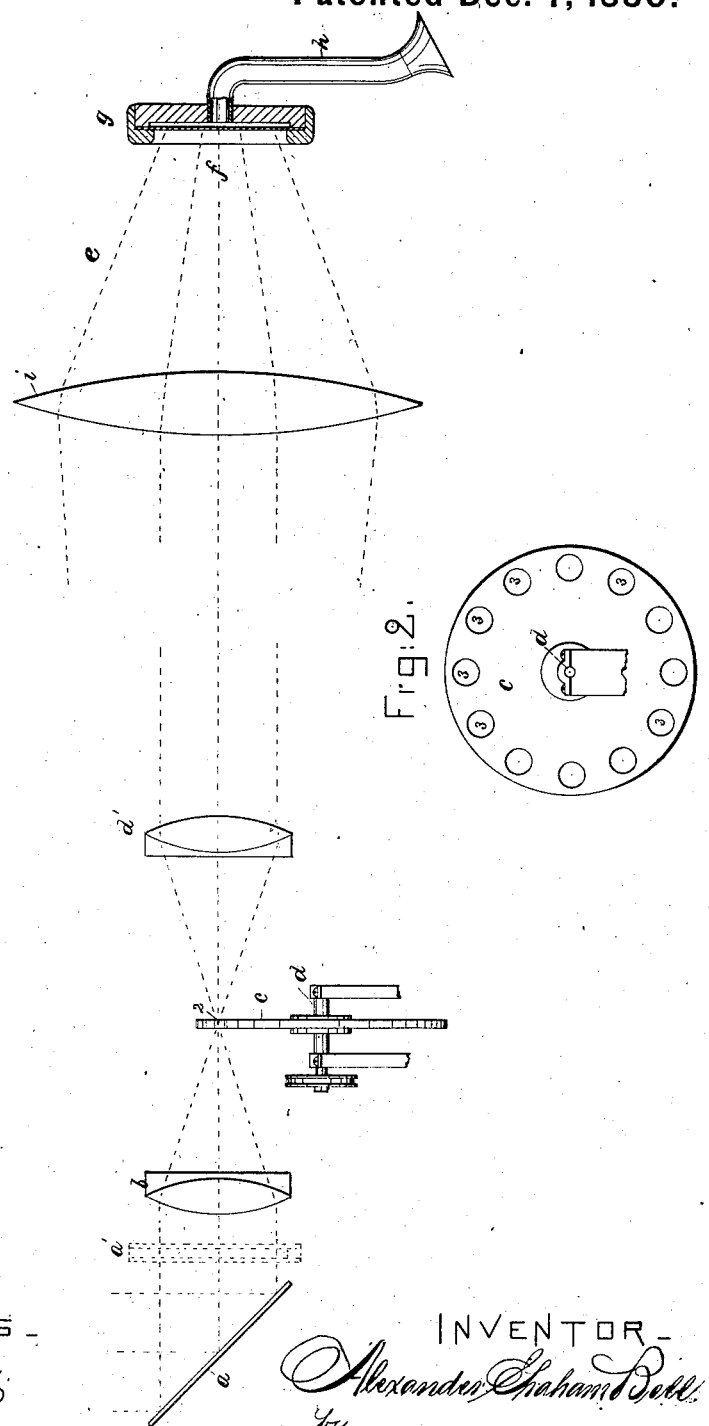

(No Model.)

A. G. BELL.
Apparatus for Signaling and Communicating, called Photophone.

No. 235,199. Patented Dec. 7, 1880.

3 Sheets—Sheet 1.

WITNESSES
N. E. C. Whitney
W. D. Dearborn

INVENTOR
Alexander Graham Bell
by
Crosby & Gregory Attys

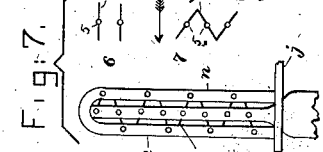

(No Model.)
A. G. BELL.
Apparatus for Signaling and Communicating, called Photophone.
No. 235,199. Patented Dec. 7, 1880.
3 Sheets—Sheet 3.
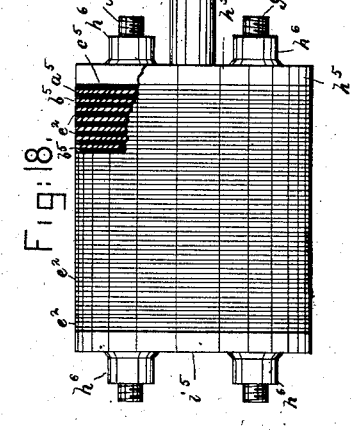
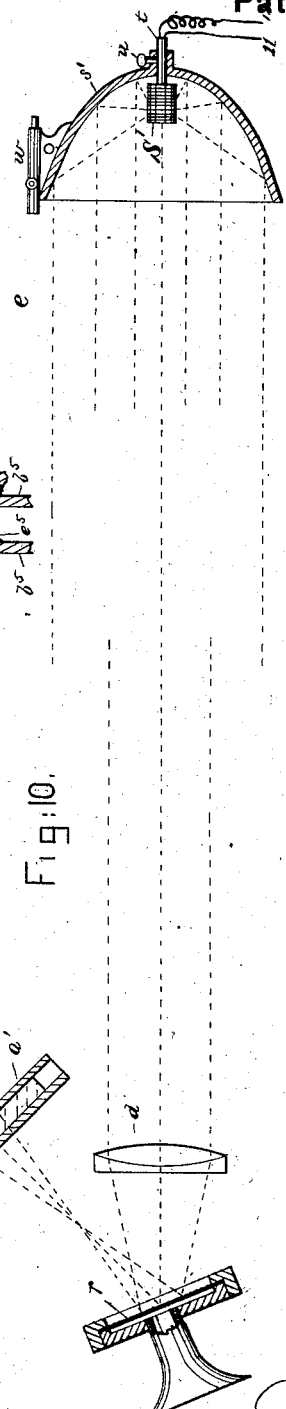
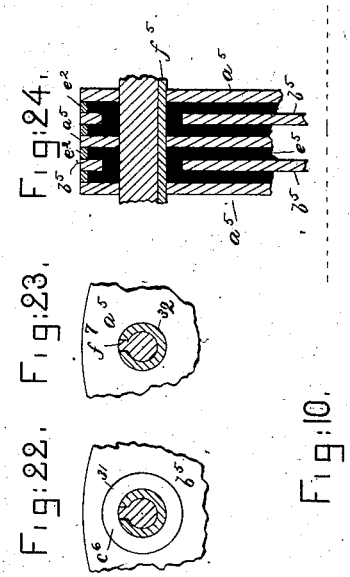
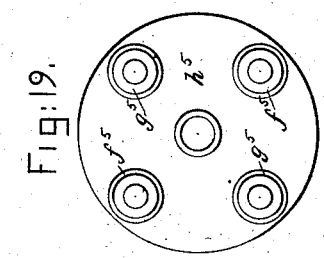
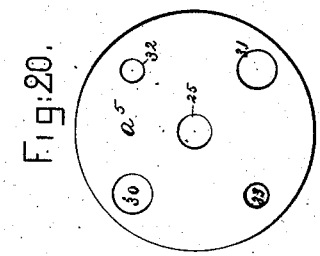
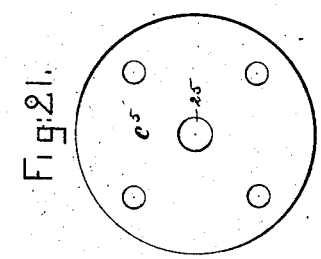
WITNESSES
N. E. Whitney
V. D. Dearborn
INVENTOR
Alexander Graham Bell
by
Crosby & Gregory Attys

UNITED STATES PATENT OFFICE.

ALEXANDER G. BELL, OF WASHINGTON, DISTRICT OF COLUMBIA, ASSIGNOR TO AMERICAN BELL TELEPHONE COMPANY, OF BOSTON, MASS.

APPARATUS FOR SIGNALING AND COMMUNICATING, CALLED "PHOTOPHONE."

SPECIFICATION forming part of Letters Patent No. 235,199, dated December 7, 1880.

Application filed August 28, 1880. (No model.)

*To all whom it may concern:*

Be it known that I, ALEXANDER GRAHAM BELL, of Washington, District of Columbia, have invented an Improved Apparatus for Signaling and Communicating, called "Photophone," of which the following description, in connection with the accompanying drawings, is a specification.

My invention consists in a method of utilizing radiant energy and of applying it by suitable apparatus to produce audible signals and to produce electric signals.

The rays which proceed from the sun and other similar sources, falling upon various bodies, produce effects generally perceived by the senses, as heat or as color. Besides this, and notably when they fall upon the substances hereinafter mentioned, the energy which they are to convey produces in those bodies a change which the sense of touch or the sense of sight has not been able to take notice of. This changed condition may be fitly called a "state of strain," and I have been able to make it manifest in various ways in different substances. My discovery and invention relate to this class of changes.

The changes in the sensitive bodies employed in the apparatus I shall describe follow the changes in the energy of the disturbing rays falling upon them with such extreme rapidity that the two are substantially coincident in time as compared with the time occupied by any vibrational movement which can be detected by the ear. The extent of the change at each instant depends upon variation in the amount of radiant energy expended upon the sensitive body at that instant, and is approximately directly proportional thereto. The change to a greater or less state of strain thus produced in the sensitive body will therefore correspond with the variations in the disturbing cause both in extent and in rapidity of successions. If, therefore, the energy of the rays acting on the sensitive body passes alternately from a maximum to a minimum—that is, exhibits a variation of a vibrational character—the changes in the sensitive body will be thereby correspondingly controlled in their period of change, in their direction of change, in their amplitude of total change, and also in the character of the changes which take place while passing from a maximum to a minimum and back again; or, in other words, the curve which graphically represents the changes thus caused in the sensitive body will correspond to the curve which represents the variations in the disturbing rays due to natural causes, or which may be impressed upon them by artificial means.

I have discovered and invented a method and apparatus for impressing any desired variation upon the rays or radiant energy falling upon the sensitive body. I have also discovered and invented a method and an apparatus by which the changes in the sensitive body from a less to a greater state of strain, and vice versa, can impart a corresponding motion to the air. If the changes succeed each other with sufficient rapidity and possess sufficient amplitude, the vibrational movements thereby imparted to the air become sensible as sound-waves, and a sound will be heard which will correspond in pitch to the rapidity with which these changes succeed each other, in loudness to their extent, and in "quality" to the character or vibrational form of the changes.

The radiant energy which affects the sensitive body may be varied in several ways. Its source may be controlled when, as in the case of a lamp, it is in our reach. The rays which convey the energy may be controlled in their passage from the source to the sensitive body—for instance, a part or the whole may be intercepted by screens opaque to them, or the whole may have their energy diminished more or less by the interposition of substances which offer resistance to the passage without wholly interrupting it, or they may be more or less concentrated upon or diverted from the sensitive body by lenses, reflectors, or other appropriate means. The sensitive body may be normally exposed to the full force of the rays, and then partially or wholly protected from them. It may be normally wholly protected from them, and then partially or wholly exposed to them, or it may be normally partially exposed to their influence, and this exposure may then be alternately increased or decreased.

In the forms of apparatus which I have devised the desired variations in the rays employed to affect the sensitive body are produced in these various ways by means of m- tion imparted to the appropriate part of the transmitter. The extent and character of the changes thereby caused in the sensitive body depend upon the extent and character of that motion, and consequently the sounds to which those changes give rise depend for their pitch upon the frequency of that motion, for their loudness upon its amplitude, and for their quality upon the character thereof. When, therefore, as in certain forms of apparatus which I have devised, a sufficient motion of the appropriate part of the transmitter is caused by the sound-waves which constitute vocal or other sounds acting upon a disk capable of vibrating, or its equivalent, the character of motion thus taken up from the air at the transmitting-station causes vibrational changes of a corresponding character in the sensitive body, and thereby vibrational movements of a corresponding character in the air at the receiving-station. Thus a similar sound to that made or uttered at the transmitting-station is heard at the receiving-station.

The receiving-instrument consists of devices to receive the beam from the transmitter and direct it upon the sensitive body, together with the sensitive body itself, and, when needed, apparatus connected therewith to produce air-vibrations or sound-waves.

An essential part of the receiver is the body sensitive to the rays which fall upon it, and the contrivances by which the disturbance therein produced by the rays is made sensible. There are several bodies whose electric conductivity is varied by the rays which fall upon them from the sun or other sources. Any variation in the amount or in the intensity of the radiant energy so falling upon them changes that conductivity or resistance. My apparatus uses this kind of sensitiveness to vary the current in a circuit, which includes the sensitive body, and also includes a telephonic receiver, which will thereupon give forth a sound whose character or quality will correspond to the character of the said variations. Selenium, when in the proper state, is the body which I have found most effective for this purpose.

I have also found that of various substances, hard rubber especially, in thin sheets—say from the thickness of an ordinary hand-telephone diaphragm up to three millimeters—is so sensitive that when the sun-rays, concentrated by lenses or reflectors, are allowed to fall upon it, and these rays are rapidly interrupted, the ear, placed in contact with or in close proximity to the hard rubber, will hear proceeding from it a sound whose pitch varies with the frequency of the interruptions and corresponds to that frequency.

I have obtained audible results by using as a receiver a disk of hard rubber, as described, and plates of gold, silver, platinum, aluminum, iron, steel, antimony, lead, Babbitt's metal, Jenks' steam-packing, tinned iron, tin-foil, brass, copper, German silver, and ordinary telephone-diaphragms. These were formed into plates about the size and thickness of the ordinary hand-telephone diaphragms. Similar results have been obtained with plates of mica, paper, different kinds of wood, patent-leather, vulcanized fiber, celluloid, ivory, silvered glass, and other substances.

The receiver may be made in the form of a tube. In this case the light, in the form of a converging pencil, is thrown in at one end, so as to reach a focus near the entering end, and thence diverging so as to strike the inside of the tube. The operator listens at the other end. The tube serves as a resonator, and greatly amplifies the effect of interruptions whose frequency corresponds with the normal pitch of the tube. I have obtained audible results with tubes of soft vulcanized rubber, of brass, and of soft wood, about one-half inch in diameter or less.

I now proceed to describe certain forms of apparatus in which I have embodied my invention.

The apparatus employed consists, essentially, of an instrument which varies the amount of radiant energy falling upon the sensitive body, (this part of the apparatus I will call the "photophonic transmitter;") of an instrument by which the variations produced in the sensitive body are directly or indirectly made sensible as sound without the intervention of electricity, or as electrical variations which are capable of producing sounds or signals by means of an electric speaking telephonic receiver or other suitable electric signaling-instrument, (this part of the apparatus I will call a "photophonic receiver;") and of various devices for giving the proper direction or diffusion to the rays employed. These instruments must be suitably arranged and placed with reference to each other.

I have spoken of the beam-controlling apparatus as the "photophonic transmitter," and the sensitive body and parts connected with it as the "photophonic receiver," and this is true if we consider chiefly the action of the beam itself; but, considering that form of apparatus shown which employs electricity as a modified electric speaking-telephone, we may properly call the beam-controller, the "beam," and the electrically-sensitive body a "variable-resistance electric speaking-telephone transmitter" operating to create electrical undulations by means of sound-waves, and the receiving-telephone as the "receiver."

If the rays are to pass over any considerable distance, they should, to obtain the best result, be formed into a parallel pencil in order to prevent dispersion and loss of effect. At the point where they are to be controlled by the transmitter they are preferably concentrated in order that a large amount of energy may be readily controlled there, and this concentration may be wholly or partially continued till they reach the sensitive body, or they may be there again concentrated, so as to exercise their full effect on a small surface, which is important in most forms of apparatus.

This management of the rays may be effected by well-known refracting and reflecting devices, the arrangement of which will be sufficiently apparent from the descriptions of apparatus hereinafter given.

Similar devices will serve to direct the rays into the most convenient path, and it will be noticed hereinafter that I have made one of the most efficient forms of transmitter by availing myself of the power of a reflector to change the direction of the rays by changing the inclination of the whole or of any part of its surface.

Figure 1 is a general diagraphic view of a transmitting and receiving photophonic apparatus embodying my invention in what I have found to be a simple and effective arrangement for the production of a musical sound or note, and Fig. 2 a detail thereof illustrating the interrupter employed in this instance.

A ray from the sun is caused to take a proper direction in any suitable manner—in this case by reflecting it from a plane mirror or heliostat, $a$, into a condensing apparatus, (shown as a lens, $b$,) which should be aplanatic and achromatic to prevent dispersion, and which brings the beam to a focus, as at 2.

A suitable screen—as a solution of alum in a glass cell, $a'$, for example—to obstruct the passage of obscure heat-rays without obstructing the passage of light, may be used to protect the apparatus from the effect of heat when the sunlight is used. I have found with certain forms of receiving-instruments employing selenium such a heat-screen does not to any great extent diminish the effect produced.

The passage of the rays at the point 2 may be interrupted or controlled in any suitable manner—as, for instance, by an interrupting wheel or disk, $c$, pivoted on an axle, $d$, so that the periphery of the said disk lies in the path of the rays; and at or near the focus 2 this disk is provided with a series of openings or holes, 3, (see Fig. 2,) lying in the range of the pencil of rays at or near the focal point 2.

As the wheel $c$ is rotated the rays will intermittingly pass through the holes 3, and then be cut off by the blank spaces between the said holes, which blanks should be at least as large as the sectional area of the beam at the point 2 to insure its complete interception. A series of alternate impulses and interruptions will thus be produced, constituting what may be termed an "intermittent beam." This beam passes on from the focal point 2, and may be directed to any desired point. The rays which diverge from the focal point 2 are again brought to the condition of a parallel pencil by the lens $d'$, and thence pass to the receiving-instrument $e$—shown in this instance as a thin disk or diaphragm, $f$, of hard rubber, placed in a suitable frame or inclosing-case, $g$, and which, as hereinbefore stated, will be affected by the intermittent beam falling on it in such manner as to produce sound-waves, the rapidity or pitch of which corresponds to the rapidity of interruption of the said beam caused by the disk $c$. The diaphragm $f$ may be placed in a suitable sound-chamber furnished with a sound-passage or ear-piece, (shown as a flexible tube, $h$,) by which the sound may be conducted to the ear of a listener.

A condensing-instrument (shown as a lens, $i$) is preferably used to concentrate the rays and increase their effect in the diaphragm $f$. The said condenser should be as large as possible, as the beam of light is somewhat dispersed in traversing any considerable distance.

It is obvious that other forms of receiving-instruments may be used in connection with the above-described transmitter, or that this receiving-instrument may be used with other forms of transmitting-instrument. Various modifications of both of these will be hereinafter described.

By varying the velocity of rotation of the disk $c$ the rapidity of interruption of the beam will be correspondingly varied, and consequently the pitch of the sound produced at the receiving-station. In this form of transmitter the motion which causes the interruptions is continuously in the same direction. I have devised other forms to be used instead of it, and in which the screens employed operate by a to-and-fro or vibratory motion given to the moving part thereof. By means of these I am enabled to give a new power and capacity to the apparatus. Figs. 4, 5, 6, 7 are such forms of apparatus.

Fig. 4 represents two gratings, $k\,l$, of which one, $k$, is fixed, while the other, $l$, is movable, and adapted to slide to and fro upon the fixed grating. In the condition shown in the drawings the opaque portion of one half overlaps and partially covers the open slit in the other, and a passage equal to about half the slit is afforded for the passage of the rays.

If the movable grating is moved slightly upward, the space allowed for the rays is diminished or entirely cut off. If it be moved slightly downward, the space is increased, and if that motion extends through a distance equal only to half the width of the narrow slit the space allowed for the rays is doubled, and the increase or diminution will be directly proportional to the amplitude of the motion.

Such gratings may be constructed with actual open slits, as shown in Fig. 4, or they may be made of glass covered with an opaque coating, (silver, for example,) which may be scraped off in strips to form the slits. I have found this kind the most convenient.

If desired, the opaque portions may be polished, and the rays reflected therefrom employed to affect the receiving-instrument, the maximum amount being reflected when the polished portion of one grating is opposite the slits or unpolished portion of the other, so that the rays are reflected from the whole surface of both, and the minimum effect is when the polished portion of one is behind that of the other, and thus rendered inoperative for reflecting. In some instances both gratings may be made movable, in which case they should be so arranged that any actuating impulse would move them in opposite directions.

In the form of intercepter or beam-controller illustrated in Figs. 5, 6, 7, a series of slats, m, of opaque material, are pivoted, as at 5, in a frame-work in the path of the rays, the said slats being all oscillated simultaneously, like the slats of a window-blind, by a rod, n, connected with the actuating-vibrator j, as shown in Fig. 6. The rod n is connected with all the slats on the same side of their pivoted points, so that they are all moved parallel; but in Fig. 7 the alternate slats are connected with the rod n on opposite sides of their pivots, so that they incline in opposite directions as they are closed. These slats, in their normal position, close about one-half the space, as shown in the main, Figs. 6 and 7, (the rays passing in the direction of the arrow,) and by their movement in one direction they increase the open space for the rays to pass until they arrive at the position shown at 6, where the maximum amount is allowed to pass, while a movement in the other direction decreases the amount until, in the position shown at 7, the rays are wholly intercepted.

It will be seen that when the slats are open, as shown at 6, they only present their edges as obstruction to the rays, and their thickness may be much less than the open space between them, so that a greater amount of rays may be allowed to pass than when the gratings shown in Figs. 3 and 4 are used, as they never allow more than half the beam to pass. By connecting the rods n nearer the pivots 5 the same extent of movement in their rods will give a greater angular movement to the slats.

It will be seen that none of these forms of screens or interruptions will give an intermittent beam, as herein described, unless they are wholly closed at each vibration; but if there be any vibration at all, the strength, and consequently the effect, of the pencil of rays which pass beyond the instrument, though never wholly interrupted, will vary in accordance with the period and with the amplitude of the vibrational movement of the moving part of the transmitter. These variations in the strength of the total beam, falling upon the sensitive body employed in the receiver, will cause in its condition changes which, in their rapidity of succession and in their extent, will correspond to the vibrational movement in the transmitter. When these changes are made sensible as sound, the pitch of that sound and the loudness of that sound will be controlled by the period and the amplitude of the motion given to the vibrational part of the transmitter.

There are many ways in which vibratory motion can be communicated to these or other forms of screen. For example, the moving portion, being made as light as possible, can be attached, as shown in Fig. 3, to a tuned reed, j, which may be moved by an electro-magnet, either directly as an automatic circuit-breaker, or by an electric current controlled by any of the well-known devices for interrupting or varying a current, or an organ-reed may be employed. In every such case the sound produced at the receiving-station will correspond in pitch and in loudness to the period of vibration, and to the amplitude of vibration of this transmitting-reed.

Fig. 8 shows photophonic apparatus by which articulate speech may be transmitted. I have already stated that the sound at the receiving-station due to the effect produced by the rays which reach the sensitive body there placed corresponds to the character of the changes in the energy of the pencil of rays which reach it.

The hereinbefore-described transmitters have been intended to control merely the pitch and the loudness of a simple musical note, and the devices in them have therefore been adapted to merely control the period during which the energy of the beam passes from its maximum to its minimum, and the range of its change or the difference of energy between its maximum and minimum.

In order to transmit articulate speech, or any sound having a complex character or quality, it is further necessary, first, that the proper character shall be impressed upon the changes in the receiver, upon the variations in the rays, and upon the motion which produces them while passing from one extreme to the other; and, second, that the voice of the speaker or the sounds to be transmitted shall of themselves operate the photophonic transmitter and impress their own character or form of vibration upon the movable part of the apparatus which controls the beam.

In the apparatus, Fig. 8, the movable part l of a screen-grating, k l, like that shown in Fig. 4, is attached to the center of a diaphragm, o, constructed, mounted, and arranged in a sound-chamber, as is usual in electric speaking-telephone transmitters. When spoken to, this diaphragm and the movable part of the screen attached thereto take up from the sound-waves the peculiar character of vibration due to the quality of the sound uttered. The same character of vibrational change is thereby imparted to the pencil of rays which passes through the instrument, and by them to the sensitive body in the receiving-instrument, where it is made sensible by a sound of corresponding quality, and the words uttered into the transmitter are heard to proceed from the receiver.

It is obvious that the diaphragm, instead of being operated directly by the sound-waves, could be made to vibrate by electrical means, such as used for imparting vibration to the diaphragm of a receiving-telephone.

It is well known that the extent of motion which can be given by the voice to a diaphragm and the parts directly connected with it is quite small. By making the slits or openings in the screen small, a slight extent of motion will cause a great percentage of change—i. e., from an almost total interruption to the passage of one-half the rays—and by suitable means the rays can be so concentrated that this range of variation will produce a great absolute change in the radiant energy falling on the sensitive body. In passing the rays through fine slits, however, some difficulties arise in the nature of interference. I have obviated these by another form of articulate-speech transmitter, which I will presently describe.

In Fig. 8 the radiant body is shown as the flame of a candle, $p$, and the lens brings the divergent rays thereof to the condition of a parallel beam, which is controlled by the gratings $k$ $l$.

Another method is to bring the rays to a focus, 2, Fig. 9, and instead of the grating $k$ $l$ employ two plates, $k'$ $l'$, one fixed and the other connected to the vibrator or diaphragm $o$, the said plates having a hole, 8, of the size and form of the image at the focal point, and the hole of the fixed grating coinciding with said image in position to allow all the rays to pass through it. The movable plate, in passing to and from a position with its hole coinciding with that of the fixed plate, allows or obstructs the passage of a greater or less portion of the pencil of rays, which are then directed to and act upon the receiving-instrument, as in the other cases described.

A single plate constructed in this manner, when properly guided, will operate in the same way, and by giving such a plate a movement parallel to the axis of the pencil of rays it will intercept an increasing portion thereof as it moves from the focal point, and thus control the beam.

The receiver, which is shown in Fig. 8, depends upon the property hereinbefore referred to as belonging to certain substances, notably properly-prepared selenium, of undergoing a great, instantaneous, and substantially proportional increase of conductivity when acted upon by the rays proceeding from the sun and other similar sources.

A piece of selenium, S, brought into a suitable condition and suitably mounted, forms part of an electric circuit, supplied with a current by a constant electro-motive force, as by the battery B. This selenium is exposed to the rays which proceed from the transmitter, and every variation caused in its conductivity produces a corresponding variation in the strength of the current. These variations will, in the manner now well known to electricians, operate an electric speaking-telephone receiver, T, (or other sensitive electrical instrument,) placed in the circuit or connected with it, and this telephonic receiver will give forth the articulate words which have been uttered into the photophonic transmitter.

In another application I have described the manner of preparing and mounting the selenium.

I now remark, however, that as the selenium, even when in its most favorable condition, is of high resistance, it is desirable to interpose it in the circuit in the form of a conductor of but slight length and of large area, which may be done very advantageously by some novel forms of cells to be hereinafter described. Some of the best forms of apparatus for this purpose consist, generically, of two or more plates of good conducting metal, separated by a thin sheet of insulating material placed between each pair of plates. This insulating-sheet has a slightly smaller surface than the conducting-plates, and the space thus left is filled up with selenium, which thus serves as a conductor between the two plates.

It is obvious that this construction enables the selenium to be used in the shape of a conductor of large area, nearly all of which is exposed to the rays, and of an extremely short length, equal to the thickness of the insulator, which may conveniently be a sheet of mica, while it uses very little selenium, and it is very easy to work the selenium into this shape by heating the metal cell and fusing the selenium into the cavity left between the two plates when the insulator is placed between them. A considerable number of these cells may be built up side by side and connected in parallel branch circuits. Besides mica, the paints which are employed in painting on china may be used to separate the metal plates when baked. As the plates are heated the said paint becomes porcelain. Various forms of cell constructed on this plan will be hereinafter described. Other forms of cells are described in other applications filed by myself, and other applications filed by myself and Mr. Sumner Tainter jointly, and others filed by Mr. Sumner Tainter.

The electric circuit being under control of the selenium resistance therein, and the selenium under control of the pencil of rays, and the rays under the control of the transmitting-instruments, it is obvious that any instruments which can be controlled by slight variations in an electric current—such as, for instance, the usual telephonic instruments—if placed in the electric circuit with the said selenium, will be controlled by and will emit sounds corresponding to the action of the said transmitting apparatus on the beam which falls on the selenium.

Fig. 10 illustrates another apparatus for transmitting complex sounds or articulate speech. As in the form last described, the sound-waves due to the voice serve to give to the movable part of the transmitter a vibrational movement of corresponding character, and this movement, in turn, impresses a vibrational or alternate variation of corresponding character upon the amount of radiant energy falling upon the sensitive part of the receiver.

The pencil of rays is passed through a suitable concentrating apparatus, $a$, (shown here as a lens,) and also through a heat-absorbing apparatus, $a'$, which prevents the heat-rays from warping the reflector of the transmitter. It then falls upon a reflector, $r$, (shown as a plane reflector placed at such an angle as to direct the rays to the receiver $e$.) After leaving this reflector the rays may be caused to pass through a lens, $d'$, in order to give them the desired parallelism, if they do not already possess it. In the drawings they are shown more concentrated on the reflector $r$ than in their path from the transmitter to the receiver. Arrived there they are caused to fall upon the sensitive receiver either directly, or, as in the drawings, after further concentration by the mirror $s'$. Tracing the path of a single ray from the lens $a$ and cell $a'$, it will be seen that its path from the reflector $r$ will depend upon the angle at which that portion of the reflector $r$ on which it falls is presented to it.

If the reflector be so placed normally that the ray will pursue the path toward the receiver shown in the drawings, then a slight change in the angle of incidence of that particular ray will, if in one direction, so alter the subsequent path of the ray as to divert it from the receiver, or if in the other direction will direct upon the receiver rays which otherwise might not have reached it. Any such change will therefore vary the amount of radiant energy exerted upon the receiver. I construct this reflector $r$ of some material—such as glass, silvered, or thin polished metal—which will take up from the sound-waves of the air their peculiar motion and vibrate in accordance with them as truly as the diaphragm of a speaking-telephone does. As it vibrates, each portion of it departs from its normal position as part of a plane surface, and bends or tips more or less in one direction or the other. Consequently each ray reflected from it is more or less diverted from its normal path, and thereby the total amount of radiant energy exerted on the sensitive receiver by all the rays reflected from the transmitter varies at each instant.

The extent of variation from instant to instant, the direction of the variation, the period of each variation, and the character of each variation depend upon the vibrational movement of the transmitting-reflector, which causes the changes, and therefore the same character of vibrational movement given to the transmitter by the voice reappears in the variations in the radiant energy operative upon the sensitive part of the receiver, and consequently in the sound or other effects due to the changes in that sensitive body. The words spoken against the transmitter are thereupon heard to proceed from the receiver. I have thus transmitted articulate speech, using as a reflector a disk of silvered glass thirty inches in diameter, of tolerable thickness, and have obtained clearer and better articulation by using as reflector a disk of thin glass, such as is used for mounting objects for the microscope, properly silvered, and about two inches in diameter.

In the drawings the reflector $r$ is shown as mounted in a mouth-piece such as is commonly used in telephones. It is essential that the mouth-piece should be so fixed and the reflector so held in it that its normal position should always be the same, in order that the rays may be directed to the receiver.

It will sometimes be desirable to mount the transmitter so as to give it a universal movement. A mounting similar to that of a telescope of a surveyor's transit accomplishes this, and a similar graduated limb is often useful.

The mouth-piece or sound-passage may be made as a flexible tube, to enable it to be readily used with the mirror $r$ in any desired angular position.

I do not herein specifically claim this particular form of transmitter, as it is a joint invention of myself and my assistant, Mr. Sumner Tainter, and will form the subject of a joint application.

A small telescope attached to the instrument may be used as a finder.

The beam, after passing from the controlling or transmitting apparatus, is received, as in the other forms described, upon a collecting and condensing instrument, (shown in this instance as a parabolic mirror, $s'$,) by which the rays are concentrated on a selenium cell, $S'$, of peculiar construction, as will be hereinafter described. The said cell is placed at the focal point of the said mirror $s'$, and is adjusted in position as shown. It is supported at the end of the tube $t$, passing through a socket at the vertex of the mirror, and held in adjusted position therein by a set-screw, $u$. The electrodes 11 12 pass out through the said tube, and may be connected with a battery and telephonic or electrical instruments, as before described in connection with Fig. 8.

A small telescope or "finder," $w$, may be employed to enable the operator to give the proper direction to the axis of the mirror; or this may be done by sighting through the tube $t$.

A simple form of selenium cell S is shown in plan and section, Figs. 11 and 12, and the different parts thereof in Fig. 13. This cell has an arrangement similar to, but in construction is different from, what is known as "Siemens spiral."

Two ribbons, $a^2$ $b^2$, of suitable conducting material, preferably brass, form the terminals of the poles of the battery B, the said ribbons being separated by thin strips $c^2$ of suitable insulating material, which is slightly narrower than the metal strip, so as to leave a slight open space between the edges of said strips. The whole is then coiled into a flat spiral, in order to give it a more convenient form for exposure to the action of the rays, a second strip, $d^2$, of insulating material being interposed to prevent conductive contact between the consecutive coils of the spiral. The said coil is then heated to a temperature slightly higher than the melting-point of selenium and solid selenium rubbed over its surface. The selenium melts, filling the channels between the metallic ribbons and forming a connection between them, as shown at $e^2$.

Ribbons of mica may be used as the insulating material to separate the plates, or they may be coated with enamel paints or Japan varnish, in which case a further amount of metal may be electro-deposited on the edges of the strips to give them the proper salience, or to form suitable channels for the reception of the selenium.

Another form of selenium cell that I have used is illustrated in plan and section in Figs. 14, 15. In this case the conducting and insulating materials are arranged in alternate parallel strips $a^3$ $b^3$ $c^3$ $d^3$, and only the alternate strips $c^3$ of insulating material have a smaller extent of surface than the inclosing metal strips, so that the selenium $e^2$, deposited, as before described, in the channels left for it, will connect only alternate pairs of the said strips—that is, connect each strip $b^3$ with the strip $a^3$ on one side thereof, but not with the strip $a^3$ on its other side. The strips $a^3$ all project on one side and are electrically connected together by the rod $f^3$, and the strips $b^3$ are connected on the other side by the rod $g^3$, and each connected set of strips with one pole of the battery, or, in other words, placed in a circuit which is completed by the selenium $e^2$.

Another form of cell used by me, and shown in plan and section in Figs. 16, 17, consists, essentially, of a metal box, $a^4$, and a disk, $b^4$, fitted in and insulated from it. The said disk is provided with a series of tapering holes, 20, and the bottom of the box with a series of pins, 21, of slightly smaller diameter than the holes, so that when in place the said pins pass into the said holes, leaving a narrow annular space around each pin. These annular spaces are filled with melted selenium $e^2$, which thus closes the circuit between the box and disk. I do not specifically claim this particular form of cell, as it was invented by my assistant, Mr. Sumner Tainter, by whom an application for Letters Patent on the said cell will be filed, in which its construction will be fully described.

Another cell which has been used with excellent results is shown at S' in Fig. 10, and in side and end views, on a larger scale, in Figs. 18 and 19, and in detail in Figs. 20, 21, 22, 23, 24. It is not herein specifically claimed, as it will form the subject of a joint application by myself and Mr. Sumner Tainter before mentioned. The principle of construction is similar to that of the cell described in connection with Fig. 14; but the surface to be exposed is cylindrical instead of plane, such form being preferable when used in connection with a parabolic mirror as the instrument for condensing the rays, as shown in Fig. 10.

Instead of rectangular strips of conducting and insulating material, circular disks $a^5$ $b^5$ $c^5$ are used. Those marked $c^5$, of insulating material, are slightly smaller in diameter than those $a^5$ $b^5$, of conducting material, so that annular channels are left between the edges of the conducting-disks $a^5$ $b^5$, around the periphery of the insulating-disks $c^5$, and in this instance such channels are left between all the said disks $a^5$ $b^5$, so that each disk $a^5$ will be connected by the adjacent annular rings $e^2$, of selenium, with both the disks $b^5$ on either side. The disks are each provided with a central hole, 25, to enable them to be held in proper position on a mandrel, where they are clamped between two suitable end plates, $h^5$ $i^5$, the disks of metal and insulating material being alternated on the said mandrel. The conducting-disks are electrically connected together in two sets of alternate plates, $a^5$ $b^5$, between which the circuit is completed by the annular rings of selenium $e^2$, following the channels around the disks of insulating material $c^5$. This connection is accomplished as follows: The disks are provided with holes, shown as four in number. In the conducting-disks two of the holes, 30 31, are of larger diameter than the other two, 32 33, which are of the same size as all four of the holes in the insulating-disks. In placing the disks on the mandrel the holes are all placed with their centers in line, and the large holes 30 31 of each conducting-disk are in line with the small holes 32 33 of the conducting-disks on each side of it, or, in other words, in a given line of holes all those of the plates $a^5$ will be of different diameter from those of the plates $b^5$.

A cylinder of conducting material of a diameter equal to that of the small holes driven through a line of holes will touch and electrically connect the alternate conducting-plates having their small holes in that line, and will not touch the other plates. Two of the cylinders, $f^5$, will connect together all the disks of one set, as $a^5$, which will form one terminal of the circuit, and the other two cylinders, $g^5$, will connect the disks of the other set, $b^5$, which will form the other terminal; but the two sets $a^5$ $b^5$ will be connected by the selenium $e^2$.

In order to insure a more perfect connection between the plates $a^5$ and cylinders $f^5$, and the plates $b^5$ and cylinders $g^5$, the said cylinders are made tubular and one or more slots, 40, cut longitudinally through their sides. Washers $c^6$, of insulating material, are placed within the large holes 30 31 in the conducting-disks, so that the said washers completely insulate and separate that portion of the said disks from the cylinders.

Melted conducting material—as, for example, type-metal—is poured into the tubes $f^3$ $g^3$, and, passing through the longitudinal slots, makes a perfect connection with the plates having small holes 32 33 around the said tubes, as shown in Fig. 23, where the type-metal is indicated by the letter $f^7$, but is prevented by the washers $c^6$ from making a contact with the plates having the large holes adjacent to it, as shown in Fig. 22.

Instead of the washers $c^6$, of insulating material, smaller washers or rings of any material—as, for instance, metal—may be used to confine the molten metal and prevent its contact with the plates at the large holes, the said rings themselves being too small in diameter to touch the said disks.

Instead of using molten metal in the tube to form the connection, pulverized conducting material may be used—as, for example, metal filings, spelter forming an excellent connector—and in such case the cell is much more readily taken apart. Nuts $h^6$ on the ends of the tubes $f^5$ $g^5$ serve to hold the whole together.

The cell is heated and the selenium melted thereon, and in all cases I have obtained better results by filing off the selenium which covered the edges of the conducting disks or strips, and leaving only the selenium between the said conducting strips or disks.

After the surface is finished the mandrel, if of conducting material, should be removed, and a handle or tube, $t$, may be screwed into one of the end plates, $h^5$, as a means for holding the cell in position.

I have shown an alum cell placed in the path of the pencil, so that the only rays which operated the instrument were luminous rays.

I have also produced audible effects with a selenium-cell receiver when I removed the alum cell and substituted a thin sheet of hard rubber—say one-eighth of an inch thick, and therefore sensibly opaque to light—and also when I placed in the path of the rays both the rubber and the alum cell. I do not therefore intend to limit myself to the employment of any particular portion of the rays which proceed from the sun or other similar bodies.

I have called the apparatus a "photophone" because an ordinary beam of light contains rays which are practically operative. I will remark, however, that cutting off the luminous rays of the sun which have passed through the lenses, as by a solution of iodine in bisulphide of carbon, stops the operation of the apparatus.

I have also employed with the selenium cell the rays of gas, of a petroleum-lamp, and of a candle, and of the lime-light. For many purposes an artificial source of light the position of which can be adjusted at pleasure, and kept unchanged and unaffected by night or weather, is more convenient than sunlight.

I have employed prepared selenium as a type of one class of sensitive bodies whose changed condition is manifested by the variation in the resistance they afford to a constant current, and a disk of hard rubber as a type of another class of bodies the changes in which can become directly audible as sound.

I have described forms of apparatus in which the radiant energy falling upon a sensitive body operates to vary the resistance of the circuit of which it forms part, others to vary the electro-motive force of current in the circuit.

The strength of the electric current in the receiving-circuit may also be varied by varying the electro-motive force developed in that circuit. Thus, for instance, a thermopile, when used as the sensitive part of the receiver, would also be directly affected by heat-rays, and would give rise to varying currents in a circuit in which it was placed; but in order that tones may be so produced, the thermopile must be not merely sensitive but much more rapid in its action than those ordinarily known.

Rays of light, as distinguished from rays of heat, will develop an electric current when falling upon the junction of two different metals when reduced to the form of thin films. Light falling on sensitive selenium will also develop a current capable of giving electric signals. In both these contrivances, however, special rapidity of action as well as great sensitiveness is required.

A beam of heat-rays, by falling upon a material arranged to absorb them quickly and again cool quickly—as fine wires strained—may be made to exhibit its variations.

The amount of rays allowed to act on the receiver may be modified by controlling the source from which they are derived, instead of intercepting or deviating them in their path. The well-known manometric flame apparatus is suitable for this purpose. The motion required to operate such a flame apparatus may be given, as is well known, by the voice.

The supply of gas for a burner may be allowed to pass through a grating similar to that shown in Fig. 4, and when the movable part is vibrated the supply of gas will be controlled accordingly.

The beam may pass from the transmitting to the receiving instrument by other than direct paths, if necessary, and for this suitable reflectors or other directing-instrument may be employed.

The instruments may be arranged with reference to each other according to the uses desired to be made of them. The transmitter and the sensitive body may be placed near together or be separated by any distance over which the rays can pass effectively.

If the transmitter be operated by an electric current, the circuit which carries that current may be of any desired length and arranged in any appropriate way known to electricians.

If an electrically-sensitive receiver be used—as, for example, a selenium cell—the circuit which contains it may be extended to any suitable distance, or may be connected with another circuit by induction-coils in a manner and for purposes well known to electricians, and to those who are familiar with variable-resistance electric speaking-telephones.

Inasmuch as the rays have no inertia and are inflexible, a slight motion of a reflector—such, for example, as it will receive if attached to the diaphragm of a receiving-telephone—can not only be made to manifest itself as light, (as in a reflecting-galvanometer,) but also as sound, or as a variation of an electric current in a secondary or local circuit supplied with its own battery.

The sound produced in the receiving-telephone is a function which is affected by at least three variables—namely, the character of the disturbing rays or of their source, the character of the variation in the path of those rays, the character of the sensitive body.

In the apparatus shown in the drawings, when mounted for use as there arranged, the second element is all that varies, and the others remain constant. In one form which I have mentioned—that in which the source of rays is a manometric flame—the variation is in the source itself, the path of the rays remaining unchanged; but it is obvious that when one element is removed and replaced by a different one—e. g., when one sensitive body is replaced by another, one source of radiant energy by another, one partially-intercepting body by another, the other elements remaining the same—this change will produce a corresponding change in the audible results and can be detected by the sense of hearing.

I claim—

1. The herein-described method of signaling or communicating, which consists in controlling a beam of rays, as to its amount or active strength in accordance with the signals to be given, and receiving the said rays on a sensitive substance forming a part of an electric circuit and affected as to its resistance in accordance with the amount or strength of the beam received upon it, whereby electric apparatus in the said circuit may be controlled to give signals corresponding to the controlling influence imparted to the beam.

2. That improvement in the art or method of transmitting or reproducing sound which consists in giving a beam of rays an undulating or intermittent character in accordance with the sound-waves it is desired to produce, and providing a receiving apparatus adapted, when acted upon by the said rays, to produce air-vibrations or sound-waves corresponding to the undulations or variations in the said beam, substantially as described.

3. The herein-described method of transmitting articulate and other sound by causing, in the rays proceeding from a photophonic transmitting-instrument to a photophonic receiver, undulatory variations in radiant energy similar in form to the sound-waves accompanying said articulate and other sounds.

4. The herein-described method of producing sounds of any desired pitch, amplitude, and quality by exposing a body sensitive to radiant energy to rays whose effective energy, exercised upon said sensitive body, is caused to vary in accordance with the vibrational form of the sound-waves appropriate to the sound to be produced.

5. The herein-described method of transmitting articulate and other sounds by causing the sound-waves which constitute said sounds to produce similar variations in the beam of rays proceeding from a photophonic transmitter to a photophonic receiver.

6. In an apparatus for communicating signals, a beam-controlling apparatus to impart a varying character to a beam of rays (from a radiant body) and a receiving apparatus sensitive to the said beam and operated thereby, to give signals corresponding to the variations in the said beam imparted by the controlling apparatus.

7. The herein-described apparatus for transmitting articulate and other sounds by causing, in rays proceeding from a photophonic transmitter to a photophonic receiver, undulatory variations in radiant energy similar in form to the sound-waves accompanying said articulate and other sounds.

8. In combination with a photophonic receiver, a photophonic transmitter, the source of radiant energy of which is varied or controlled substantially as described.

9. In an apparatus for producing or reproducing sound at a distant station by means of variations in radiant energy, means, as described, for varying the amount of such energy which reaches the distant station by motion imparted to the transmitting apparatus.

10. A photophonic receiver adapted to produce, by the action of a beam of varying character from a radiant source, dynamic or electric effects corresponding with said character, substantially as described.

11. In an apparatus for sound-transmission, a device for controlling the beam during its passage from its source, in contradistinction to controlling the source itself, said device being actuated by the waves which constitute said sound to give the beam an undulatory character or variations in effective strength similar in form to the said sound-waves, substantially as described.

12. In a photophonic transmitter, the combination of a movable and an immovable portion to control the amount of radiant energy passing from it, substantially as described.

13. The combination, with the movable part of a photophonic transmitter, of mechanism operating electrically for giving motion to said part, substantially as described.

14. The method of producing a beam of varying character for photophonic transmission by controlling the amount of radiant energy which is allowed to pass in the desired direction from a constant source.

15. A beam-controlling device comprising a vibratory medium and means, as indicated, for varying the amount of radiant energy which is allowed to proceed from a constant source in a given direction in accordance with the vibrations of said medium, substantially as described.

16. The combination, with a transmitting apparatus to give a beam from a radiant body an undulatory character or variations in effective strength, of a receiving apparatus sensitive to the said beam and having the property of emitting sound under the influence and corresponding to the character of the said beam, substantially as described.

17. In an apparatus for sound-transmission, a transmitting apparatus to control a beam from a radiant body, and a receiving apparatus containing, as a portion of an electric circuit, a device the electrical condition of which is varied in accordance with the strength or character of the beam affecting it, and telephonic instruments in circuit therewith, substantially as described.

18. In an instrument containing selenium as a portion of an electric circuit, two or more strips of conducting material separated by insulating material, arranged to leave a portion of the space between the said strips unoccupied thereby, and selenium placed in the said unoccupied space to complete an electric circuit between the said conducting-strips, substantially as and for the purpose described.

In testimony whereof I have signed my name to this specification in the presence of two subscribing witnesses.

ALEXANDER GRAHAM BELL.

Witnesses:
JOS. P. LIVERMORE,
ARTHUR REYNOLDS.